US009940956B1

(12) United States Patent
Cao et al.

(10) Patent No.: US 9,940,956 B1
(45) Date of Patent: Apr. 10, 2018

(54) APPARATUS AND METHOD FOR REDUCING CORROSION IN CAPPING LAYER OF MAGNETIC RECORDING READER

(71) Applicant: Western Digital (Fremont), LLC, Fremont, CA (US)

(72) Inventors: Rong R. Cao, Pleasanton, CA (US); Yung-Hung Wang, San Jose, CA (US); Lifan Chen, Fremont, CA (US); Haifeng Wang, Morgan Hill, CA (US); Chih-Ching Hu, Pleasanton, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 0 days.

(21) Appl. No.: 15/198,364

(22) Filed: Jun. 30, 2016

(51) Int. Cl.
*G11B 5/40* (2006.01)
(52) U.S. Cl.
CPC ..................... *G11B 5/40* (2013.01)
(58) Field of Classification Search
None
See application file for complete search history.

(56) References Cited

U.S. PATENT DOCUMENTS

| | | | | |
|---|---|---|---|---|
| 6,268,985 B1* | 7/2001 | Pinarbasi | ............... | B82Y 10/00 360/324.12 |
| 6,313,973 B1 | 11/2001 | Fuke | | |
| 6,600,638 B2 | 7/2003 | Gill | | |
| 6,785,954 B2* | 9/2004 | Horng | ............... | B82Y 10/00 29/603.07 |
| 7,050,273 B2* | 5/2006 | Horng | ............... | B82Y 10/00 360/322 |
| 7,800,867 B2 | 9/2010 | Saito et al. | | |
| 8,023,233 B2 | 9/2011 | Nishimura et al. | | |
| 8,514,524 B2* | 8/2013 | Wu | ............... | G11B 5/3163 360/319 |
| 8,531,801 B1* | 9/2013 | Xiao | ............... | G11B 5/3909 360/319 |
| 8,673,654 B2 | 3/2014 | Hong et al. | | |
| 8,780,506 B1* | 7/2014 | Maat | ............... | G11B 5/3932 360/319 |
| 8,797,692 B1* | 8/2014 | Guo | ............... | G11B 5/3909 360/319 |
| 9,053,719 B2* | 6/2015 | Yang | ............... | G11B 5/3909 |
| 9,165,570 B2* | 10/2015 | Lu | ............... | G01R 33/093 |
| 9,177,575 B1* | 11/2015 | Gao | ............... | G11B 5/3909 |
| 9,196,283 B1 | 11/2015 | Osugi et al. | | |
| 2007/0047153 A1* | 3/2007 | Zeltser | ............... | B82Y 10/00 360/324 |

(Continued)

FOREIGN PATENT DOCUMENTS

EP 1607980 A2 * 12/2005 ............. B82Y 10/00
JP 2005032780 A * 2/2005

*Primary Examiner* — William J Klimowicz
(74) *Attorney, Agent, or Firm* — Loza & Loza, LLP; Gabriel Fitch

(57) ABSTRACT

Aspects of the present disclosure provide a magnetic reader and methods for fabricating the same. The magnetic reader has a capping layer structure that can reduce or impede the corrosion and/or recession of a shield layer of the magnetic reader. In a particular embodiment, the capping layer structure includes a ruthenium (Ru) layer that is configured to impede oxygen interdiffusion between an IrMn antiferromagnetic layer and a Ta cap layer.

18 Claims, 6 Drawing Sheets

(56) References Cited

U.S. PATENT DOCUMENTS

| | | | |
|---|---|---|---|
| 2009/0279213 A1* | 11/2009 | Wu ...................... | G11B 5/3163 |
| | | | 360/319 |
| 2010/0079917 A1* | 4/2010 | Miyauchi ............... | B82Y 25/00 |
| | | | 360/319 |
| 2013/0001189 A1* | 1/2013 | Zhao .................... | G11B 5/3906 |
| | | | 216/22 |
| 2015/0170686 A1* | 6/2015 | Singleton ............. | G11B 5/3912 |
| | | | 360/319 |
| 2015/0371666 A1* | 12/2015 | Xiao ........................ | G11B 5/11 |
| | | | 360/319 |

* cited by examiner

500

| Test 1 | | Corrosion | |
|---|---|---|---|
| Wafer ID | Cap | No | Yes |
| Wafer 1 | Ta40 | 9 | 1 |
| Wafer 2 | Ta40 | 8 | 2 |

600

| Test 2 | | Corrosion | |
|---|---|---|---|
| Wafer ID | Cap | No | Yes |
| Wafer 3 | Ru25/Ta15 | 19 | 1 |
| Wafer 4 | Ru30/Ta10 | 30 | 0 |
| Wafer 5 | Ru40 | 37 | 0 |

APPARATUS AND METHOD FOR REDUCING CORROSION IN CAPPING LAYER OF MAGNETIC RECORDING READER

BACKGROUND

In a magnetic storage hard drive, a writer records data to one or more rotating disks or platters by changing the magnetic properties of the target portion on the disk or platter. To read the recorded data back from the disk or platter, a magnetic sensing element or reader transforms the magnetic field from a rotating disk or platter to an electrical signal. The writer and reader are typically included in a slider. A reader can be fabricated by layering various materials in a stack structure. Some examples of readers are tunnel magnetoresistance (TMR) reader, giant magnetoresistance (GMR) reader, scissor reader, and heat assisted magnetic recording (HAMR) reader.

DETAILED DESCRIPTION

In the related art, a layer stack for a magnetic reader may exhibit corrosion and/or a recession resulting from the corrosion at a shield including, for example, an antiferromagnetic layer and/or a Ta capping layer. Such defects can be observed at the air bearing surface (ABS) of a slider containing the reader after lapping. The corrosion/recession may adversely affect the aerodynamic characteristics of the ABS and degrade reader performance and reliability.

A Ta layer is often used as the capping layer or top layer of the magnetic reader stack or shield because the Ta capping layer can facilitate subsequent fabrication processes such as etchings (e.g., reactive ion etching) and photolithography sub-processes. As to the corrosion problem, the inventors speculated that the corrosion and/or recession might come from the side edge of the shield. Therefore, different solutions were proposed to reduce the recession and/or corrosion of the shield. For example, parameters of the milling processes (e.g., power, angle, etc.) may be adjusted in order to protect the sides of the antiferromagnetic layer (e.g., an IrMn layer). In another example, a protection layer (e.g., alumina) may be placed at the sides of the IrMn layer. However, these solutions did not appear to adequately address the corrosion problem.

Aspects of the present disclosure provide a magnetic reader and methods for fabricating the same. The magnetic reader has a capping layer structure that can reduce or prevent the corrosion and/or recession of a shield layer of the magnetic reader. In a particular embodiment, the capping layer structure includes a ruthenium (Ru) layer that is configured to impede oxygen interdiffusion between an antiferromagnetic layer and a cap layer. This method is different from the approaches commonly known in the art and the original approach outlined in the prior paragraph. In particular, these methods do not contemplate the observation that the corrosion/recession problem is caused, in part or in whole, by the interdiffusion between the antiferromagnetic layer and the cap layer.

Figure 1:
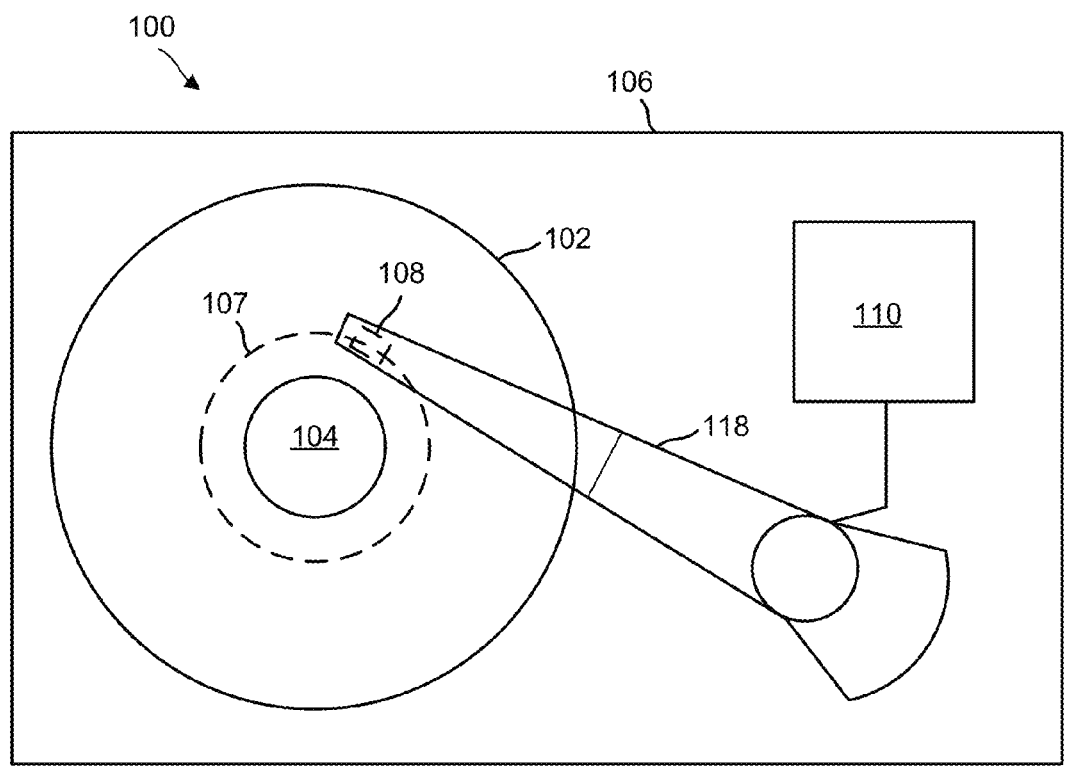
FIG. 1 is a top schematic view of a disk drive including a magnetic medium in accordance with one embodiment of the disclosure.

FIG. 1 is a top schematic view of a disk drive 100 including a magnetic medium 102 in accordance with one embodiment of the disclosure. Disk drive 100 may include one or more disks/media 102 to store data. Disk/media 102 resides on a spindle assembly 104 that is mounted to drive housing 106. Data may be stored along tracks in the magnetic recording layer of disk 102. The reading and writing of data is accomplished with the head 108 that may have both read and write elements. The write element is used to alter the properties of the magnetic recording layer of disk 102 and thereby write information thereto. In some embodiments, the head 108 may have a heat-assisted magnetic recording (HAMR) reader, a tunnel magnetoresistance (TMR) reader, or a giant magnetoresistance (GMR) reader. In an alternative embodiment, the head 108 may be another type of head, for example, an inductive read/write head or a Hall effect head. In operation, a spindle motor (not shown) rotates the spindle assembly 104, and thereby rotates disk 102 to position the head 108 at a particular location along a desired disk track 107. The position of the head 108 relative to the disk 102 may be controlled by a position control circuitry 110 via a control arm 118.

Figure 2:
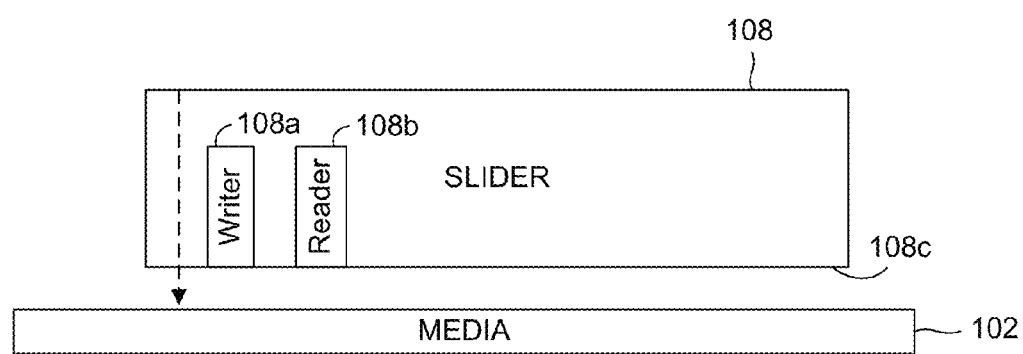
FIG. 2 is a side schematic view of a slider and a magnetic medium of FIG. 1 in accordance with one embodiment of the disclosure.

FIG. 2 is a side schematic view of the slider 108 and a magnetic medium 102 of FIG. 1 in accordance with one embodiment of the disclosure. The slider 108 includes one or more write elements (e.g., writer) 108a and one or more read elements (e.g., reader) 108b positioned along an air bearing surface (ABS) 108c of the slider for writing information to, and reading information from, respectively, the media 102. FIGS. 1 and 2 illustrate a specific embodiment of a magnetic recording system. Aspects of this disclosure may also be used with other magnetic recording systems including HAMR, TMR, and GMR systems.

Figure 3:
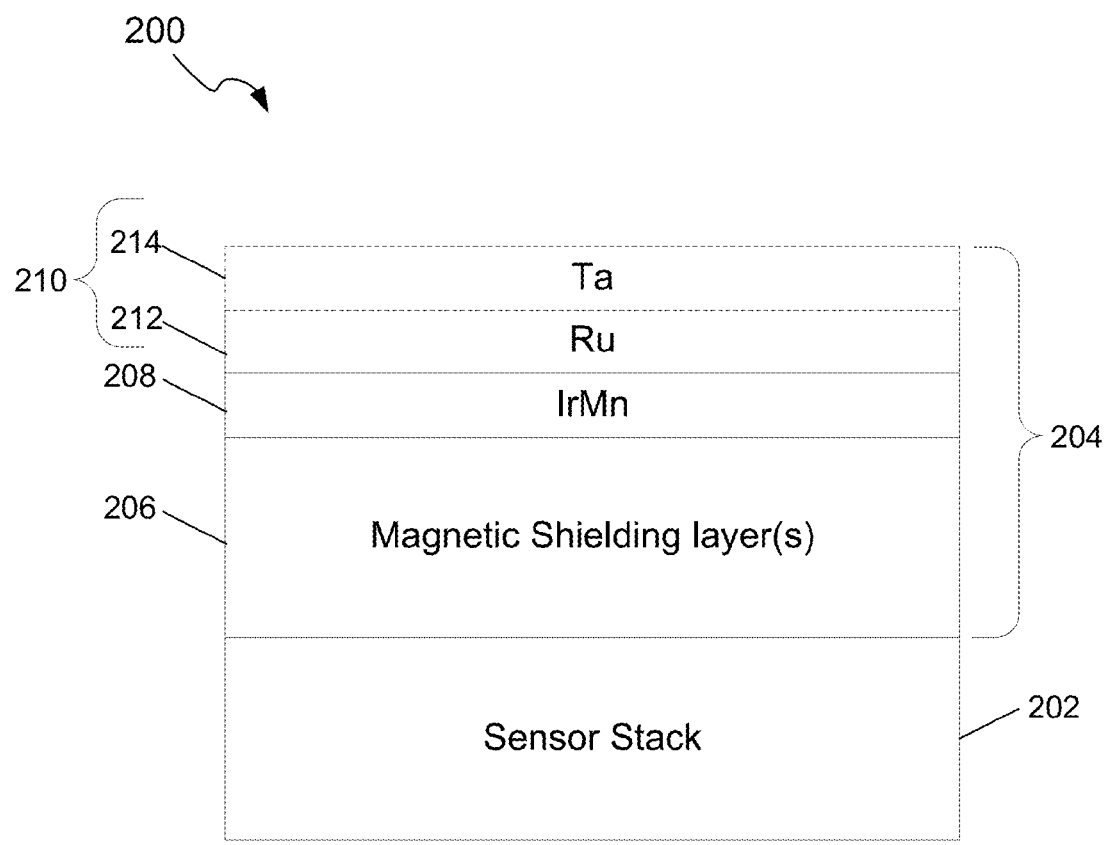
FIG. 3 is a schematic view of a magnetic reader stack including a capping layer structure in accordance with one embodiment of the disclosure.

FIG. 3 is a schematic view of a magnetic stack 200 including a capping layer structure in accordance with one embodiment of the disclosure. In one example, the magnetic reader 108b (see FIG. 2) may have the same magnetic stack 200 structure. FIG. 3 illustrates an ABS side view of the magnetic stack 200. In other embodiments, the magnetic stack 200 may find applications in other magnetic devices or apparatuses including magnetoresistive random-access memory (MRAM).

In this example, the magnetic stack 200 includes a sensor stack 202 and a shield 204 on the sensor stack. The sensor stack 202 may include various layers for example: an underlayer, an antiferromagnetic layer, a pinned magnetic layer, a spacer layer, a free magnetic layer. These layers may include materials generally known in the art used for a magnetic sensor or reader. In some embodiments, the sensor stack 202 may have more or less other layers and different layering orders. In some examples, the sensor stack 202 may include an HAMR reader, TMR reader, or a GMR reader. In other examples the sensor stack 202 may include more than one free magnetic layer. The magnetic stack 200 may also include a lower shield, and the sensor stack 202 is between the shield 204 (upper shield) and lower shield (not shown). In other examples the magnetic stack 200 may include more than one sensor stack 202.

The shield 204 may include one or more magnetic-shielding layers 206, an antiferromagnetic layer 208 (e.g., antiferromagnetic magnetic-biasing layer) on the one or more magnetic-shielding layers 206, and a capping-layer structure 210 on the antiferromagnetic layer 208. In some embodiments, the magnetic-shielding layers 206 may be antiferromagnetically coupled. In some embodiments, the magnetic-shielding layers 206 may be ferromagnetically coupled. The antiferromagnetic layer 208 may stabilize the magnetization direction in the sensor via magnetic exchange coupling. In some embodiments of the disclosure, the antiferromagnetic layer 208 may be made of a material containing substantially IrMn, PtMn, FeMn, NiMn, and CoMn. The capping-layer structure 210 has a structure that can impede, reduce, and/or prevent oxygen interdiffusion between the antiferromagnetic layer 208 and the capping-layer structure 210. In one embodiment of the disclosure, the capping-layer structure 210 includes a cap layer 214 and a barrier layer 212 that is positioned between the cap layer 214 and the antiferromagnetic layer 208.

The barrier layer 212 is configured to impede, reduce, or prevent oxygen interdiffusion between the cap layer 214 and the antiferromagnetic layer 208. In the example illustrated in FIG. 3, the barrier layer 212 contains substantially Ru, the cap layer 214 contains substantially Ta, and the antiferromagnetic layer 208 contains substantially IrMn. In some embodiments of the disclosure, the cap layer 214 may include a material made of substantially (e.g., 50% or more) tantalum (Ta), chromium (Cr), or nickel-iron (NiFe). The barrier layer 212 is configured to prevent or reduce oxidation of the antiferromagnetic layer 208 and/or cap layer 214 due to oxygen movement or exchange between the layers.

In a comparison example that has no barrier layer, it has been shown that a cap layer was substantially oxidized after lapping. In this example, the corrosion or oxidation of a Ta cap layer and/or an IrMn antiferromagnetic layer, might be caused by the insufficient Ta capping coverage such that an oxygen interdiffusion could occur between the Ta layer and IrMn layer. The corrosion of the IrMn layer may weaken the exchange coupling between the layers, leading to reader performance and reliability issues.

The capping-layer structure 210 of FIG. 3 can reduce or prevent similar oxidation problems because the barrier layer 212 (e.g., Ru layer) may impede or reduce oxygen interdiffusion between the Ta layer 214 and IrMn layer 208. In some embodiments of the disclosure, the barrier layer 212 may be made of materials that can impede, reduce, or prevent oxygen interdiffusion between the cap layer 214 and antiferromagnetic layer 208. In general, the barrier layer 212 has no or low affinity to oxygen. For example, the barrier layer 212 may be made of a material consisting substantially of ruthenium (Ru), iridium (Ir), osmium (Os), rhodium (Rh), platinum (Pt), palladium (Pd), silver (Ag), and gold (Au). In some embodiments of the disclosure, the barrier layer 212 may be made of a noble metal including for example Ru, Rh, Pd, Ag, Os, Ir, Pt, and Au.

In some embodiments of the disclosure, the barrier layer 212 may have a thickness between about 25 Angstrom and about 100 Angstrom, and in a particular example, between about 25 Angstrom and about 40 Angstrom. In one embodiment of the disclosure, the barrier layer 212 may have a thickness of about 40 Angstrom. In some embodiments, a magnetic reader or the stack 200 may not include the Ta layer 214. In one embodiment of the disclosure, the capping-layer structure 210 includes a Ta layer 214 with a thickness of about 15 Angstrom and a Ru layer 212 with a thickness of about 25 Angstrom. In another embodiment of the disclosure, the capping-layer structure 210 includes a Ta layer 214 with a thickness of about 10 Angstrom and a Ru layer 212 with a thickness of about 30 Angstrom.

Figure 4:
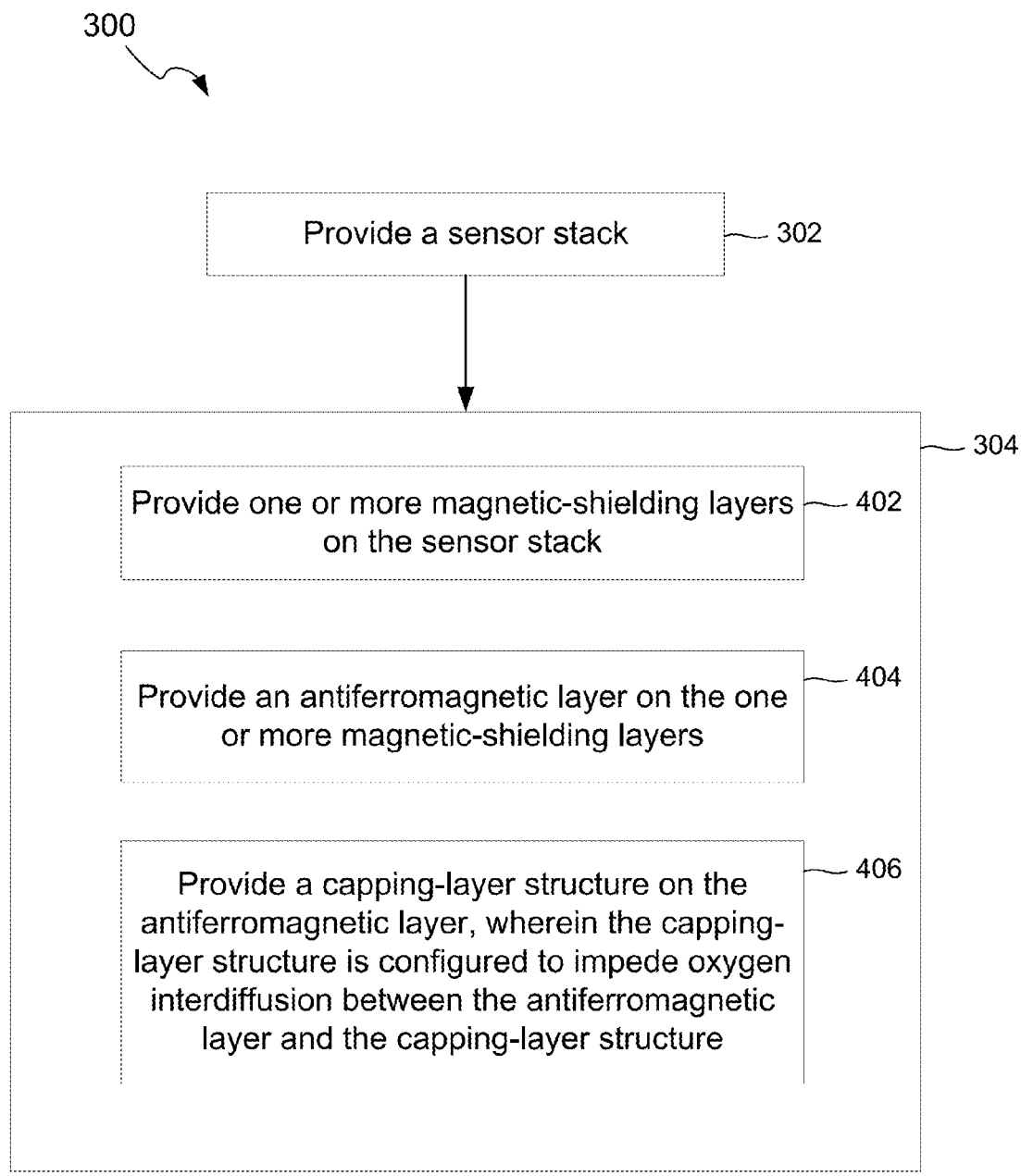
FIG. 4 is a flowchart illustrating a method for reducing capping layer corrosion of a magnetic reader in accordance with one embodiment of the disclosure.

FIG. 4 is a flowchart of a method 300 for reducing capping layer corrosion of a magnetic reader in accordance with one embodiment of the disclosure. The method 300 may be utilized to fabricate the magnetic stack 200 of FIG. 3 or other similar devices. At block 302, the method provides a sensor stack 202 (see FIG. 3). The sensor stack 202 may be a magnetic reader including various layers known in the art. For example, the sensor stack 202 may include one or more of an underlayer, an antiferromagnetic layer, a pinned magnetic layer, a spacer layer, a free magnetic layer, and a capping layer.

At block 304, the method provides a shield 204 (see FIG. 3) on the sensor stack. For example, at block 402, the method provides one or more magnetic-shielding layers 206 on the sensor stack. At block 404, the method provides an antiferromagnetic layer 208 on the one or more magnetic-shielding layers. At block 406, the method provides a capping-layer structure 210 on the antiferromagnetic layer. As described above with reference to FIG. 3, the capping-layer structure is configured to impede, reduce, or impede oxygen interdiffusion between the antiferromagnetic layer and the capping-layer structure.

In one embodiment, the above-described processes of the method 300 may be performed in a vacuum chamber with multiple targets such that the various layers of the magnetic reader can be formed in a vacuum environment (e.g., in situ). In some embodiments, multiple vacuum chambers may be used to form the various layers while the partially finished magnetic reader or stack is transferred between the vacuum chambers in a vacuum environment. In both examples, the various layers of the magnetic reader may be formed in a vacuum environment in one or multiple vacuum chambers. When multiple chambers are used, the partially finished stack may be transferred between the chambers in a vacuum environment.

For example, in several embodiments, the deposition of the layers of the magnetic reader can be performed using a variety of deposition sub-processes, including, but not limited to physical vapor deposition (PVD), sputter deposition and ion beam deposition, and chemical vapor deposition (CVD) including plasma enhanced chemical vapor deposition (PECVD), low pressure chemical vapor deposition (LPCVD) and atomic layer chemical vapor deposition (ALCVD). In other embodiments, other suitable deposition techniques known in the art may also be used.

Figure 5:
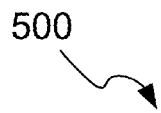
FIG. 5 is a table illustrating the total number of defects found in magnetic readers not including a barrier layer on a given wafer.
Figure 6:
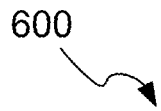
FIG. 6 is a table illustrating a reduction in the total number of defects found in magnetic readers fabricated on a given wafer according to the method of FIG. 4.

FIG. 5 is a table 500 illustrating the total number of defects (corrosion or recessions) found in magnetic readers without a barrier layer on a certain wafer. FIG. 6 is a table 600 that illustrates a reduction in the number of defects found in magnetic readers fabricated according to the method of FIG. 4. For the table 500, two wafers (wafer 1 and wafer 2) containing multiple magnetic readers without a barrier layer (e.g., barrier layer 212 of FIG. 2) were tested for the presence of recessions/corrosion in an antiferromagnetic layer of a shield. These readers disposed on the wafers have a stack structure similar to that of the magnetic stack 200 except that they do not have the barrier layer 212. Each of the readers of wafer 1 and wafer 2 has a Ta cap layer with a thickness of about 40 Angstrom. Ten sample readers were tested for each wafer. For wafer 1, one of the ten samples had corrosion. For wafer 2, two of the ten samples had corrosion.

For table 600, three wafers (wafer 3, wafer 4, and wafer 5) each containing multiple magnetic readers having a barrier layer (e.g., barrier layer 212 of FIG. 2) were tested for the presence of recessions/corrosion in an antiferromagnetic layer of a shield. These readers disposed on the wafers have a stack structure similar to that of the magnetic stack 200. Each of the readers of wafer 3 and wafer 4 has a Ru/Ta capping-layer structure (e.g., capping-layer structure 210) similar to that of the magnetic stack 200. The readers of wafer 3 have a Ta cap layer with a thickness of about 15 Angstrom and a Ru barrier layer with a thickness of about 25 Angstrom. The readers of wafer 4 have a Ta cap layer with a thickness of about 10 Angstrom and a Ru barrier layer with a thickness of about 30 Angstrom. The readers of wafer 5 have a Ru barrier layer with a thickness of about 40 Angstrom without a Ta cap layer. For wafer 3, one out of twenty tested sample readers had corrosion. For wafer 4, all thirty tested sample readers had no corrosion. For wafer 5, all thirty-seven tested sample readers had no corrosion. Thus, it can be observed that the wafers with the barrier layer fabricated according to the method of FIG. 4 have significantly less corrosion than the wafers without the barrier layer.

Figure 7:
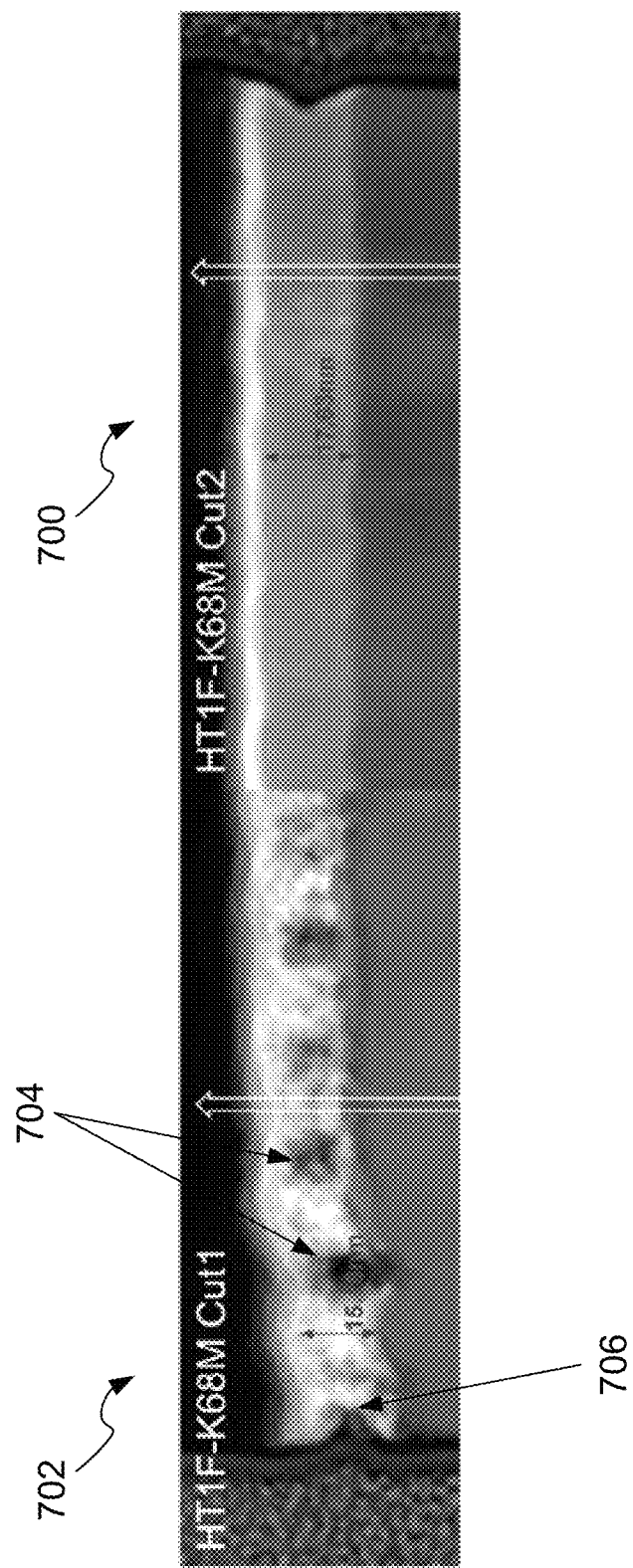
FIG. 7 is a drawing illustrating a corroded capping layer and a non-corroded capping layer fabricated in accordance with one embodiment of the disclosure placed side by side for comparison.

FIG. 7 is a drawing illustrating a corroded capping layer and a non-corroded capping layer fabricated in accordance with one embodiment of the disclosure placed side by side for comparison. The non-corroded capping layer 700 is shown on the right side of the drawing, and the corroded capping layer 702 is shown on the left side of the drawing. The non-corroded capping layer 700 may have the same stack structure as that of the stack 200 of FIG. 2, and may be fabricated according to the method of FIG. 4. In this example, the non-corroded capping layer 700 has a barrier layer (e.g., such as barrier layer 212 of FIG. 2) that can impede, reduce, or prevent interdiffusion between an antiferromagnetic layer and a capping-layer. Without such a barrier layer, the capping layer 702 shows corrosion 704 that can adversely affect the performance of the reader and cause significant recession 706 in the antiferromagnetic layer (e.g., IrMn).

Figure 8:
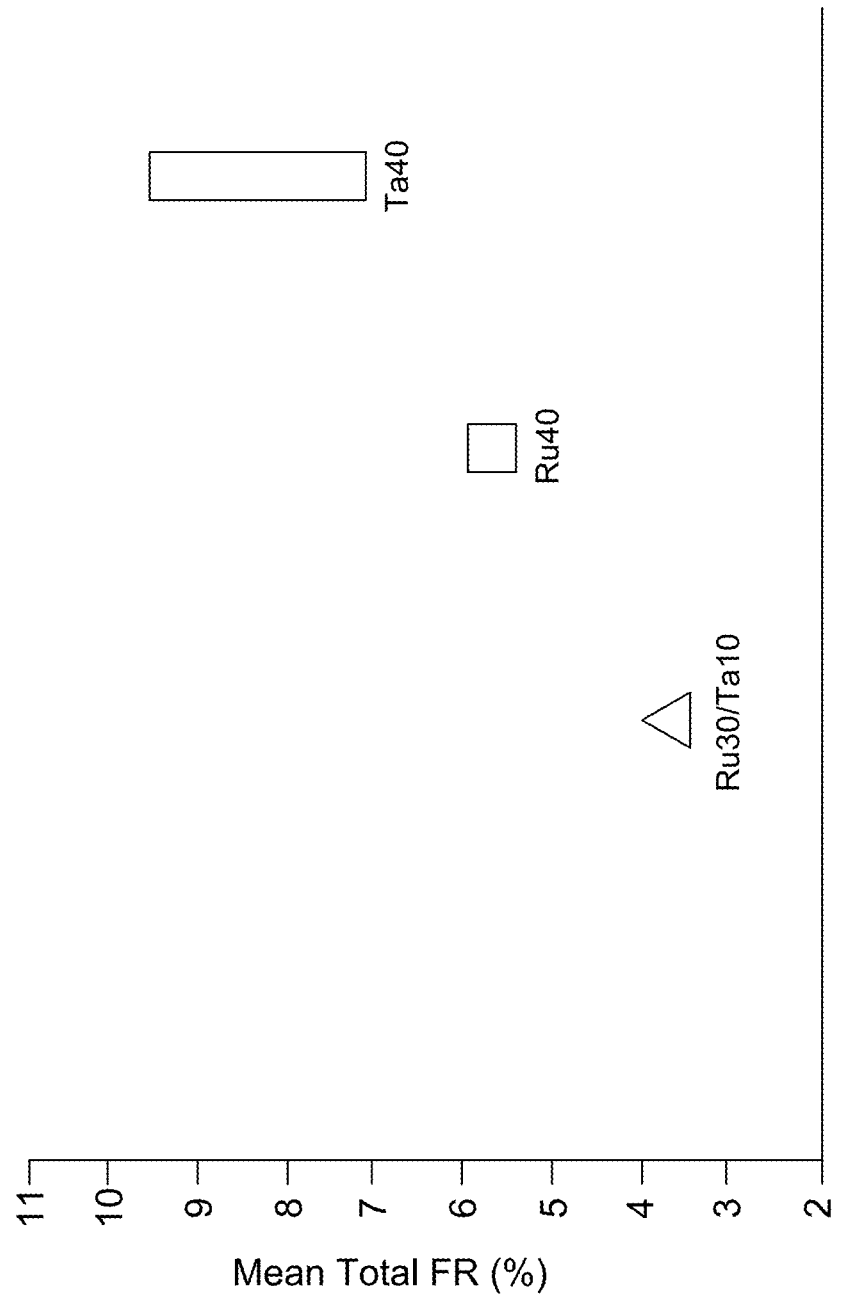
FIG. 8 is a chart illustrating improvements in magnetic performance of shields including a Ru barrier layer in accordance with some embodiments of the disclosure.

FIG. 8 is a chart illustrating improvements in magnetic performance of shields including a Ru barrier layer as described above. Three wafers each including a Ru barrier layer exhibit improved reliability over a comparative example without the Ru barrier layer. A first wafer (Ru30/Ta10) has a shield structure including a Ru layer with a thickness of about 30 Angstrom and a Ta capping layer with a thickness of about 10 Angstrom. The mean total failure rate for the first wafer is between about 3 percent and about 4 percent. A second wafer (Ru40) has a shield structure including a Ru layer with a thickness of about 40 Angstrom as the capping layer with no Ta layer. The mean total failure rate for the second wafer is between about 5 percent and about 6 percent. The comparative example Ta40 has a Ta capping layer with a thickness of about 40 Angstrom. The failure rate of the comparative example Ta40 is between about 7 percent and about 10 percent. As the data indicates, a reader with a capping structure that includes the Ru barrier layer and a Ta top layer provides improved magnetic performance in the form of less total failure over comparative readers without the Ru barrier layer. While the inventors suspected that the readers with the capping structure including the Ru barrier layer disclosed herein might address the corrosion problem, the improved magnetic performance was an unexpected beneficial result.

The terms "above," "below," and "between" as used herein refer to a relative position of one layer with respect to other layers. As such, one layer deposited or disposed above or below another layer may be directly in contact with the other layer or may have one or more intervening layers. Moreover, one layer deposited or disposed between layers may be directly in contact with the layers or may have one or more intervening layers.

While the above description contains many specific embodiments of the invention, these should not be construed as limitations on the scope of the invention, but rather as examples of specific embodiments thereof. Accordingly, the scope of the invention should be determined not by the embodiments illustrated, but by the appended claims and their equivalents.

In one embodiment, the drawings may be considered as having been drawn to scale. In another embodiment, the drawings may be considered as having not been drawn to scale. Unless specifically designated as being prior art, no part of this specification may be considered an admission of prior art.

The various features and processes described above may be used independently of one another, or may be combined in various ways. All possible combinations and sub-combinations are intended to fall within the scope of this disclosure. In addition, certain method, event, state or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other suitable manner. Tasks or events may be added to or removed from the disclosed example embodiments. The example systems and components described herein may be configured differently than described. For example, elements may be added to, removed from, or rearranged compared to the disclosed example embodiments.

What is claimed is:

1. A magnetic reader configured to read information stored on a magnetic medium, comprising:
   a sensor stack; and
   a shield on the sensor stack, wherein the shield comprises:
      one or more magnetic-shielding layers;
      an antiferromagnetic layer on the one or more magnetic-shielding layers; and
      a capping-layer structure on the antiferromagnetic layer, wherein the capping-layer structure is configured to impede oxygen interdiffusion between the antiferromagnetic layer and the capping-layer structure, wherein the capping-layer structure comprises:
   a first layer comprising one or more materials selected from the group consisting of tantalum (Ta), chromium (Cr), and nickel-iron (NiFe); and
   a second layer comprising a material selected from the group consisting of iridium (Ir), osmium (Os), rhodium (Rh), platinum (Pt), palladium (Pd), silver (Ag), and gold (Au), wherein the second layer is between the first layer and the antiferromagnetic layer.

2. The magnetic reader of claim 1, wherein the second layer has a thickness of at least 25 Angstrom.

3. The magnetic reader of claim 1, wherein the antiferromagnetic layer comprises IrMn, and the first layer comprises Ta.

4. The magnetic reader of claim 1, wherein the antiferromagnetic layer comprises a material selected from the group consisting of IrMn, PtMn, FeMn, NiMn, and CoMn.

5. The magnetic reader of claim 1, wherein the magnetic reader is included in a magnetic slider of a disk drive.

6. The magnetic reader of claim 1, wherein the one or more magnetic-shielding layers are antiferromagnetically coupled.

7. The magnetic reader of claim 1, wherein the one or more magnetic-shielding layers are ferromagnetically coupled.

8. A method of reducing capping layer corrosion of a magnetic reader, comprising:
providing a sensor stack;
providing a shield on the sensor stack, comprising:
providing one or more magnetic-shielding layers on the sensor stack;
providing an antiferromagnetic layer on the one or more magnetic-shielding layers; and
providing a capping-layer structure on the antiferromagnetic layer, wherein the capping-layer structure is configured to impede oxygen interdiffusion between the antiferromagnetic layer and the capping-layer structure, wherein the capping-layer structure comprises:
a first layer comprising one or more materials selected from the group consisting of tantalum (Ta), chromium (Cr), and nickel-iron (NiFe); and
a second layer comprising a material selected from the group consisting of iridium (Ir), osmium (Os), rhodium (Rh), platinum (Pt), palladium (Pd), silver (Ag), and gold (Au), wherein the second layer is between the first layer and the antiferromagnetic layer.

9. The method of claim 8, wherein the second layer has a thickness of at least 25 Angstrom.

10. The method of claim 8, wherein the antiferromagnetic layer comprises IrMn, and the first layer comprises Ta.

11. The method of claim 8, wherein the one or more magnetic-shielding layers are antiferromagnetically coupled.

12. The method of claim 8, wherein the one or more magnetic-shielding layers are ferromagnetically coupled.

13. A disk drive comprising:
a magnetic medium configured to store data; and
a head configured to read the data, wherein the head comprises:
a sensor stack; and
a shield on the sensor stack, wherein the shield comprises:
one or more magnetic-shielding layers;
an antiferromagnetic layer on the one or more magnetic-shielding layers; and
a capping-layer structure on the antiferromagnetic layer, wherein the capping-layer structure is configured to impede oxygen interdiffusion between the antiferromagnetic layer and the capping-layer structure, wherein the capping-layer structure comprises:
a first layer comprising one or more materials selected from the group consisting of tantalum (Ta), chromium (Cr), and nickel-iron (NiFe); and
a second layer comprising a material selected from the group consisting of iridium (Ir), osmium (Os), rhodium (Rh), platinum (Pt), palladium (Pd), silver (Ag), and gold (Au), wherein the second layer is between the first layer and the antiferromagnetic layer.

14. The disk drive of claim 13, wherein the second layer has a thickness of at least 25 Angstrom.

15. The disk drive of claim 13, wherein the antiferromagnetic layer comprises IrMn, and the first layer comprises Ta.

16. The disk drive of claim 13, wherein the antiferromagnetic layer comprises a material selected from the group consisting of IrMn, PtMn, FeMn, NiMn, and CoMn.

17. The disk drive of claim 13, wherein the one or more magnetic-shielding layers are antiferromagnetically coupled.

18. The disk drive of claim 13, wherein the one or more magnetic-shielding layers are ferromagnetically coupled.

* * * * *